DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED NOVEMBER 4, 1975

940 O.G. 6

T940,006

PLASTICIZER BLENDS FOR TOBACCO SMOKE FILTER RODS AND FILTER RODS BONDED BY SUCH BLENDS

Gerald P. Morie, 2317 Briarcliff Road, and Cephas H. Sloan, Rte. 5, both of Kingsport, Tenn. 37660

Filed May 31, 1974, Ser. No. 475,342
Int. Cl. A24b *15/02*
U.S. Cl. 131—267
No Drawing. 6 Pages Specification

Plasticizer blends for bonding at room temperature tobacco smoke filter rods formed of cellulose acetate filaments and comprising about 40 to about 70% by weight of (triacetin) glycerol triacetate and about 30 to about 60% by weight of a low-vapor pressure ester selected from the group comprising triethyl citrate, acetyltriethylcitrate, trimethylol propane triacetate, 2,2,4-trimethyl, 1,3-pentanediol diacetoacetate and 1,3-butanediol diacetoacetate. The amount of blend applied to the cellulose acetate filaments comprises about 6 to about 20% of the weight of the cellulose acetate filaments, and preferably about 6 to about 11% of the weight of the cellulose acetate filaments. The invention is also directed to a tobacco smoke filter rod as bonded with such plasticizer blends.